(12) United States Patent
Wake (10) Patent No.: US 6,374,974 B1
(45) Date of Patent: Apr. 23, 2002

(54) ROLLER TYPE CLUTCH MECHANISM

(75) Inventor: Masato Wake, Lombard, IL (US)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 09/432,408

(22) Filed: Nov. 2, 1999

(30) Foreign Application Priority Data

Nov. 6, 1998 (JP) .......................................... 10-316274

(51) Int. Cl.$^7$ .............................................. F16H 39/00
(52) U.S. Cl. ...................................................... 192/45
(58) Field of Search ............................ 192/44, 45, 38, 192/43, 41 R (56) References Cited

U.S. PATENT DOCUMENTS

| | | | | |
|---|---|---|---|---|
| 3,904,005 A | * | 9/1975 | Husmann ..................... | 192/45 |
| 4,106,602 A | * | 8/1978 | Dieckermann .............. | 192/45 |
| 4,368,809 A | * | 1/1983 | Husmann ..................... | 192/45 |
| 4,415,072 A | * | 11/1983 | Shoji et al ..................... | 192/45 |
| 4,828,085 A | * | 5/1989 | Lederman .................... | 192/45 |
| 4,852,707 A | * | 8/1989 | Ito et al. ....................... | 192/44 |
| 5,176,232 A | * | 1/1993 | Malecha ....................... | 192/45 |
| 5,183,139 A | * | 2/1993 | Malecha ....................... | 192/45 |
| 5,595,273 A | * | 1/1997 | Endoy et al. ................. | 192/45 |

* cited by examiner

Primary Examiner—Charles A Marmor
Assistant Examiner—Saúl Rodríguez
(74) Attorney, Agent, or Firm—Miles & Stockbridge P.C.

(57) ABSTRACT

A roller type clutch mechanism comprises an outer race, an inner race radially spaced apart from the outer race and concentrically disposed in the outer race for relative rotation, a plurality of rollers disposed between the outer race and the inner race for transmitting torque between the outer race and the inner race, a spring member for biasing the rollers in one rotational direction, and a cage disposed between the rollers to keep the rollers at substantially equal intervals, and engaged with the spring member to bias the rollers in a meshing direction.

17 Claims, 9 Drawing Sheets

ROLLER TYPE CLUTCH MECHANISM

BACKGROUND OF THE INVENTION

1. Field of the Invention

This invention relates to a roller type clutch mechanism for utilization in the transmission of an automobile, an agricultural machine, a construction machine, an industrial machine or the like.

2. Related Background Art

A roller type clutch mechanism, e.g. a roller type one-way clutch, used in an automatic transmission has an outer race and an inner race rotatable relative to each other, and a plurality of rollers for transmitting torque between the outer race and the inner race mesh with a cam surface provided on the raceway surface of the outer race or the inner race to thereby transmit rotational torque only in one direction. Also, the rollers are designed to be idly rotated in the opposite direction.

Generally, in the roller type clutch mechanism, a plurality of rollers are independently disposed circumferentially between the inner and outer races, and are biased in a meshing direction by discrete biasing springs.

In such prior-art structure, the respective rollers can be discretely displaced (non-synchronism) and therefore, the operation becomes unstable under a condition of strong vibration. Also, without any bearing, resistance is low to eccentricity.

Further, in a two-way roller type clutch mechanism, when during idle rotation, one of rollers meshes with a cam on the opposite side for some reason or other, the shock thereof may cause an inconvenience or damage to the clutch mechanism itself or the whole of an apparatus using the same.

SUMMARY OF THE INVENTION

It is the object of the present invention to provide a roller type clutch mechanism provided with a cage which can synchronize all rollers in their integral state and can achieve the stability of operation under a high load and strong vibration, the resistance to eccentricity, the prevention of popping and further, in the case of a two-way clutch, an improvement in the reliability of idle rotation.

To achieve the above object, a roller type clutch mechanism provided with a cage according to the present invention comprises:

an outer race;
an inner race radially spaced apart from said outer race and concentrically disposed in said outer race for relative rotation;
a plurality of rollers disposed between said outer race and said inner race for transmitting torque between said outer race and said inner race;
a spring member for biasing said rollers in one rotational direction; and
a cage disposed between said rollers to keep said rollers at substantially equal intervals, and engaged with said spring member to bias said rollers in a meshing direction.

All the rollers are integrated and synchronized as a whole and each roller, when viewed individually, can independently move by an amount corresponding to the slight gap between it and the cage. Accordingly, the stability of operation under a high load and strong vibration, the resistance to eccentricity, the prevention of popping and further, in the case of a two-way clutch, an improvement in the reliability of idle rotation.

DESCRIPTION OF THE PREFERRED EMBODIMENTS

Some embodiments of the present invention will hereinafter be described in detail with reference to the accompanying drawings. In the drawings, like portions are designated by like reference characters.

First Embodiment

Figure 1:
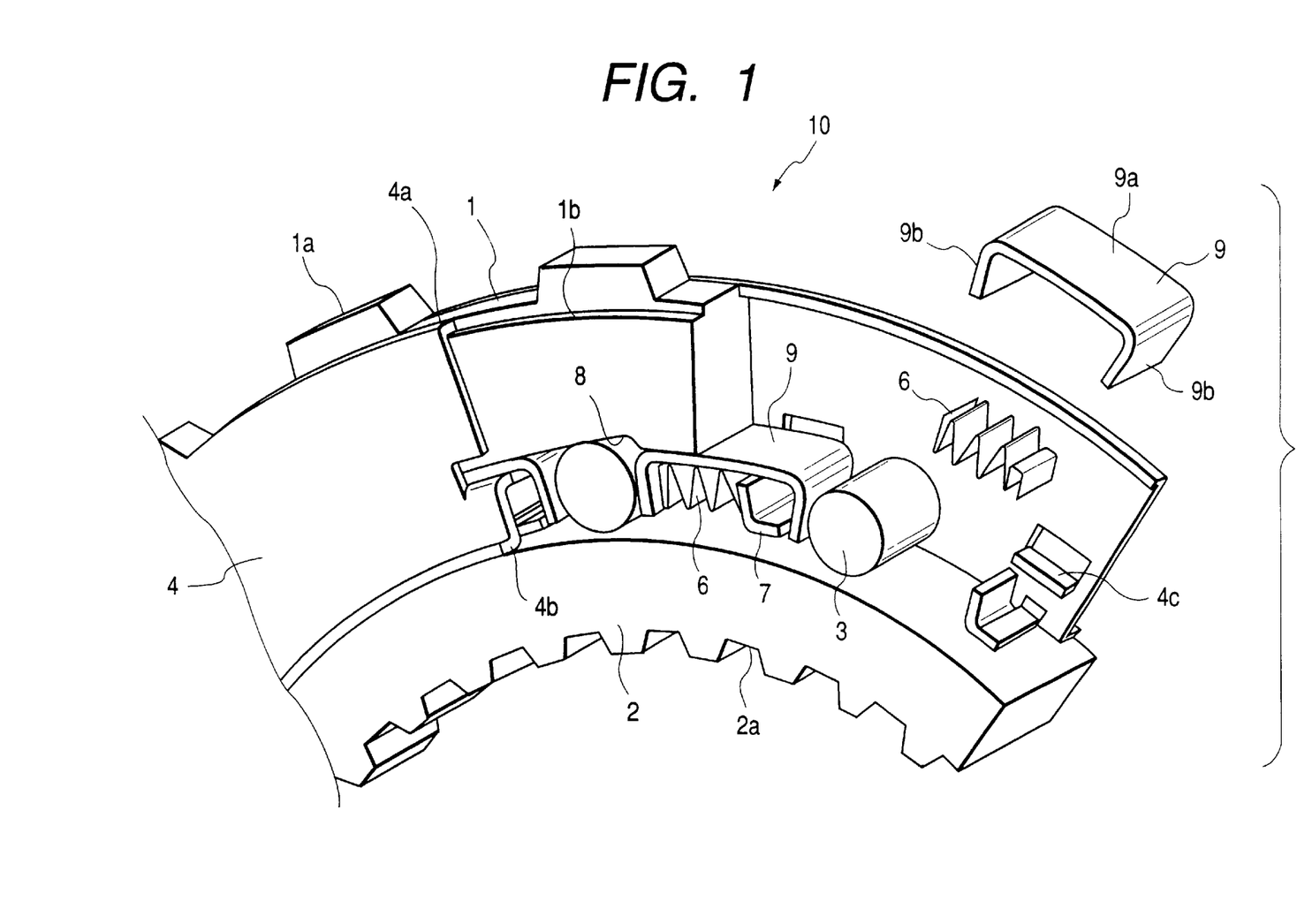
FIG. 1 is an exploded perspective view of a roller type clutch mechanism according to a first embodiment of the present invention.

FIG. 1 is an exploded perspective view of a roller type clutch mechanism provided with a cage according to a first embodiment of the present invention. In each of the following embodiments, a one-way clutch mechanism (a one-way clutch) is taken up as a clutch mechanism. Also, for the sake of convenience of description, the roller type clutch mechanism is simply referred to as the "one-way clutch". However, as shown in a fourth embodiment which will be described later, the present invention can of course be also applied to a two-way clutch mechanism.

Referring to FIG. 1, the one-way clutch 10 comprises a rotatable inner race 2 provided with a spline 2a fitted to a rotatable member, not shown, on the inner periphery thereof, an outer race 1 disposed outside the inner race 2 for rotation relative to the inner race 2, and fixed to a member, not shown, through a spline 1a, and a plurality of cylindrical rollers 3 disposed circumferentially between the annular outer peripheral surface of the inner race 2 and the annular inner peripheral surface of the outer race 1. If necessary, the axial end surface of each roller 3 can be chamfered over the full circumference thereof. In the present embodiment, the inner race 2 is rotated and the outer race 1 is fixed. However, it is also possible to rotate the outer race and fix the inner race. This also holds true of the other embodiments which will hereinafter be described.

A plurality of cam surfaces 8 are circumferentially disposed at predetermined intervals on the inner periphery of the outer race 1. An annular side plate 4 is fitted between the outer race 1 and the inner race 2, and concentrically maintains the inner and outer races. The side plate 4 has an annular flange portion 4a axially bent toward the outer race on the radially outer edge portion thereof, and an annular flange portion 4b axially bent in the direction opposite to the flange portion 4a on the radially inner edge portion thereof. The flange portion 4a is fitted to an annular stepped portion 1b provided on the outer race 1, and the flange portion 4b is opposed to the outer peripheral surface of the inner race 2 with a predetermined clearance therebetween.

An accodion-shaped spring member 6 supported by a supporting portion 7 axially protruded from the side plate 4 is disposed between the rollers 3. Between the rollers 3, a cage 9 is further interposed so as to cover the spring member 6 and the supporting portion 7.

The cage 9 is formed by a flat plate member and is provided with an upper surface 9a and depending portions 9b downwardly extending substantially vertically from the opposite ends of the upper surface 9a, and the axial cross-section thereof is U-shaped. Accordingly, the upper surface 9a is opposed to the inner peripheral surface of the outer race 1, and the outer surfaces of the depending portions 9b are opposed to the rollers 3. An axially inwardly extending projection 4c is provided on the side plate 4 with a predetermined gap circumferentially with respect to the inner surface of the outer race. The projection 4c comes into under the upper surface 9a of the cage 9, and sandwiches the spring member 6 between it and the supporting portion 7. The projection 4c holds the cage 9 so that the cage 9 can smoothly move circumferentially without the lower ends of the depending portions 9b contacting the raceway surface of the rollers 3 or without making backlash vertically.

By the above-described construction, all the rollers 3 are integrated and synchronized as a whole, and each roller 3, when individually viewed, can move independently by an amount corresponding to the slight clearance d (see FIG. 2) of the cage 9.

Thus, the biasing force of the spring 6 is transmitted to the rollers 3 through the depending portion 9b of the circumferentially movable cage 9.

The cage 9 is between the rollers 3 and keeps the rollers 3 at an equal interval and is engaged with the spring member 6 and biases the rollers 3 in a looking direction by the spring force thereof. That is, it has the functions of a spacer and a holder.

Second Embodiment

Figure 2:
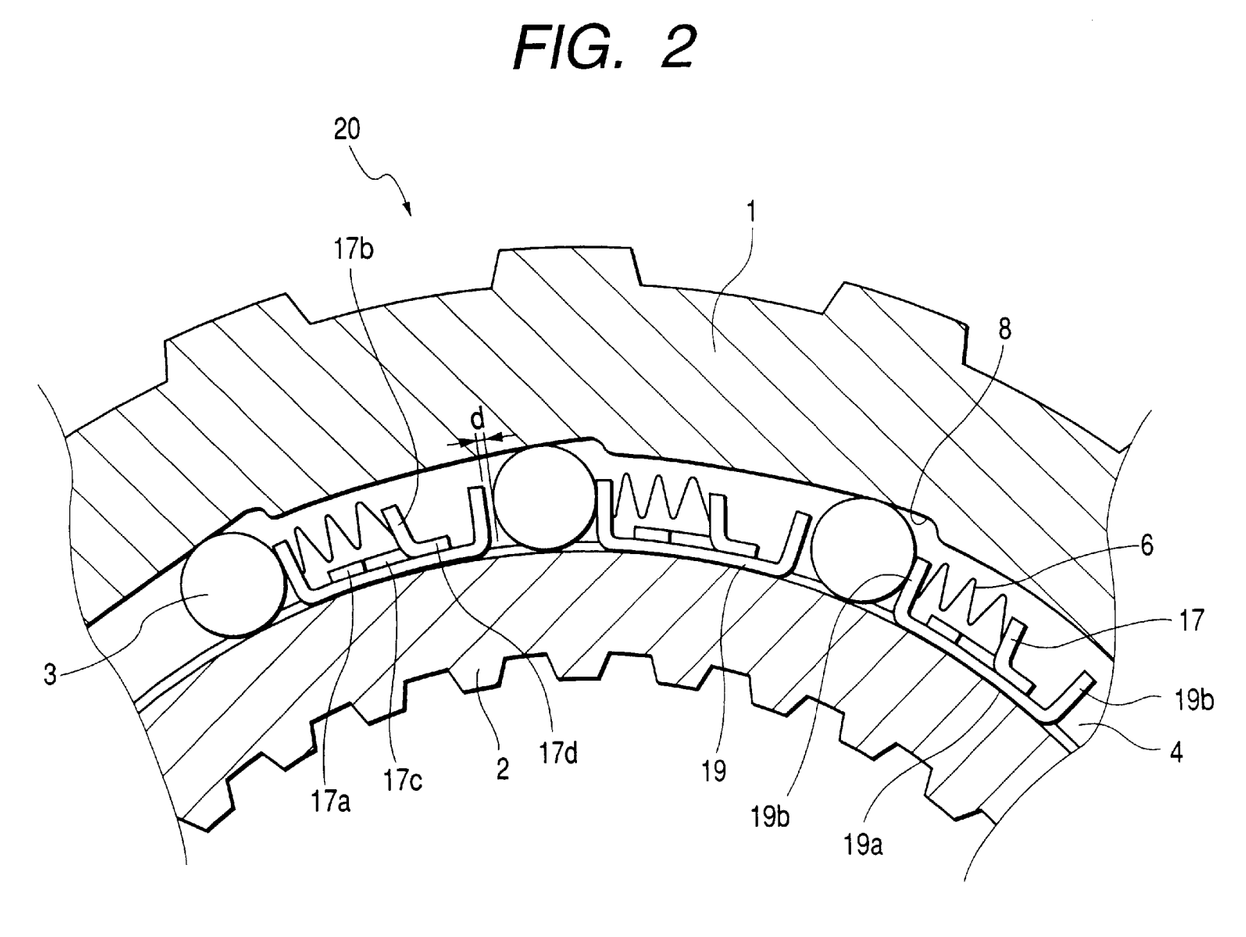
FIG. 2 is a radial fragmentary cross-sectional view showing a roller type clutch mechanism according to a second embodiment of the present invention.

FIG. 2 is a radial fragmentary cross-sectional view of a roller type clutch mechanism 20 provided with a cage according to a second embodiment of the present invention. The basic construction of this embodiment is the same as that of the first embodiment and therefore, the portions thereof need not be described.

The difference of the second embodiment from the first embodiment is the disposition of a cage 19. In the first embodiment, the cage 9 is provided with the upper surface 9a and the depending portions 9b, and the upper surface 9a is opposed to the inner peripheral surface of the outer race 1, but in the second embodiment, the cage 19 comprises a lower surface 19a and rising portions 19b rising substantially vertically therefrom. That is, the cage 19 is of a construction substantially converse to that of the first embodiment.

The lower surface 19a frictionally contacts with the outer peripheral surface of the inner race 2, and a supporting portion 17 extending axially inwardly from the side plate 4 bears against the upper surface of this lower surface 19a. The spring member 6 having one end thereof supported by the supporting portion 17 has its other end brought into contact with the rising portion 19b of the cage 19.

Figure 8:
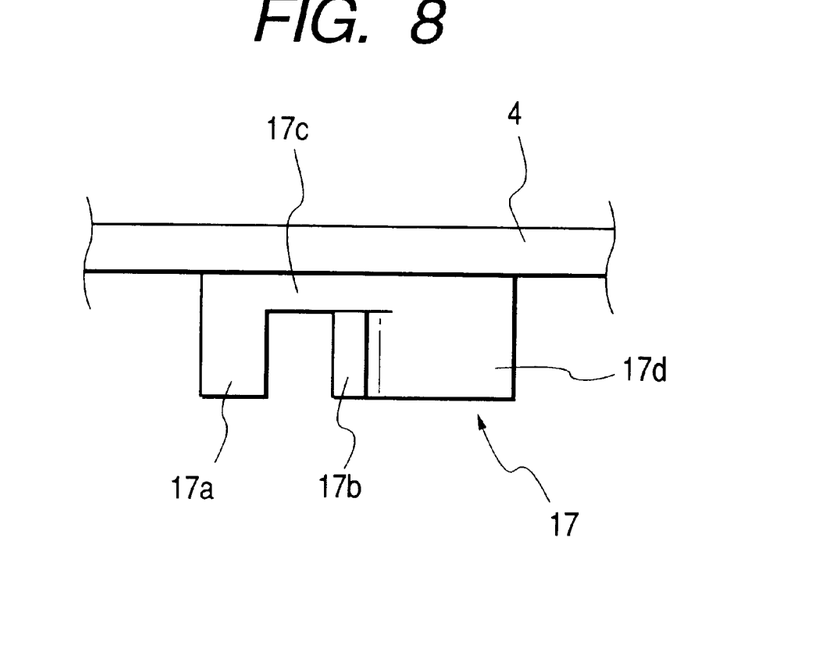
FIG. 8 is a top plan view showing the details of the supporting portion of the roller type clutch mechanism according to the second embodiment of the present invention.
Figure 9:
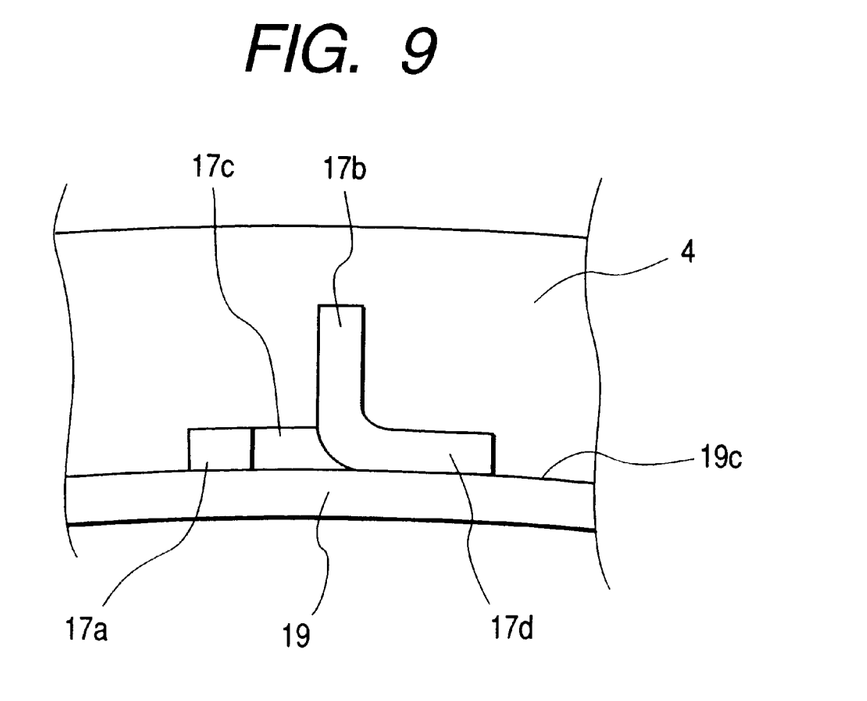
FIG. 9 is a side view of the supporting portion of FIG. 8.

As shown in FIGS. 8 and 9, the supporting portion 17 is integrally formed as a plate member extending axially from the side plate 4. The supporting portion 17 comprises three flat bottom surfaces 17a, 17c and 17d. A spring supporting portion 17b rises from the bottom surface 17d. The total wide area of the three bottom surfaces 17a, 17c and 17d frictionally contacts with the upper surface 19c of the cage 19 and therefore can support the spring 6 and can guide the cage 19 well relative to the outer peripheral surface of the inner race 2.

By the above-described construction, the rollers 3 are integrated and synchronized as a whole, and each roller 3, when individually viewed, can more independently by an amount corresponding to the slight clearance d of the cage 19.

Thus, the biasing force of the spring member 6 is transmitted to the rollers 3 through the rising portions 19b of the circumferentially movable cage 19. In the second embodiment, the supporting portion 17 for the spring member 6 serves to support the spring member 6 and also guide the cage 19.

Third Embodiment

Figure 3:
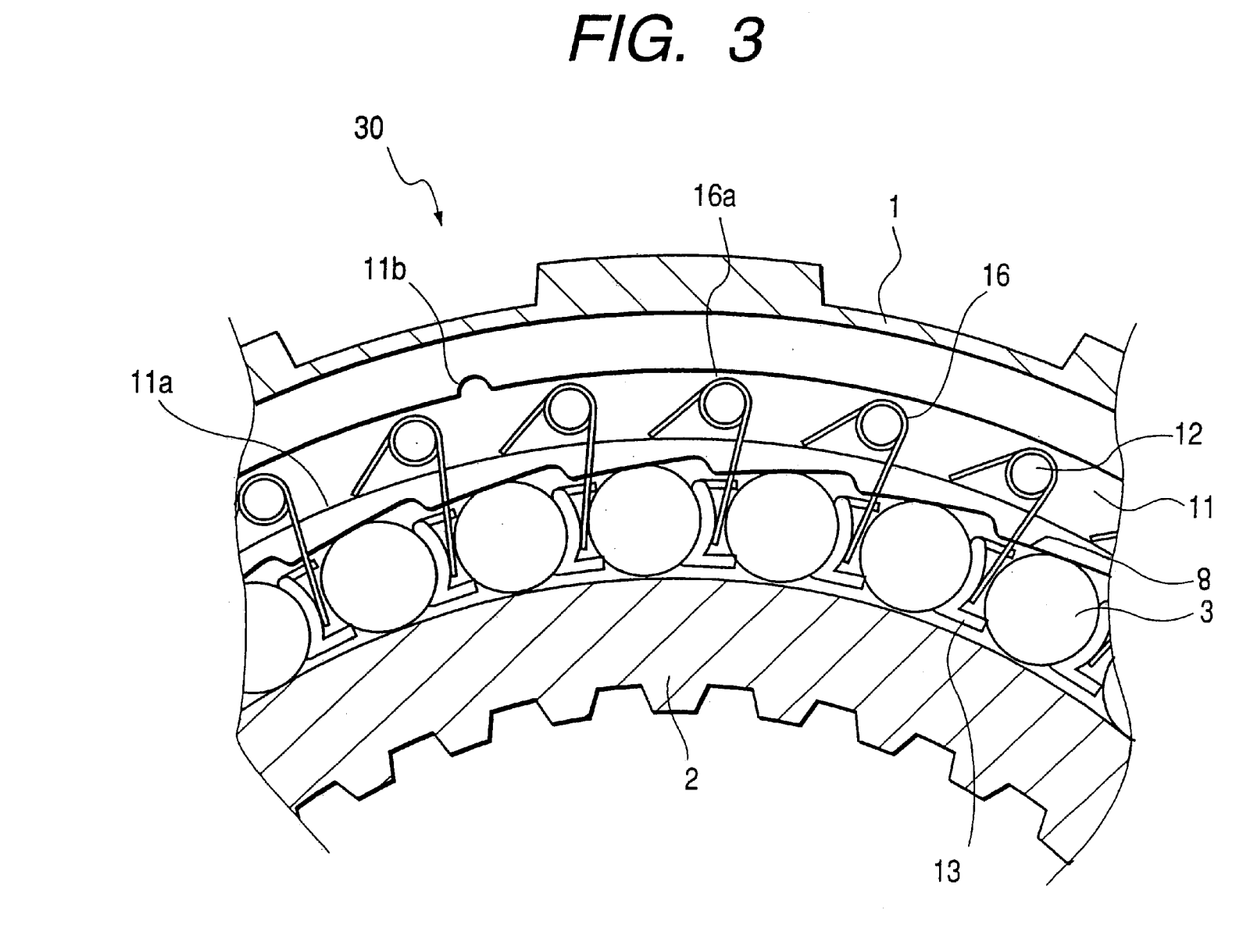
FIG. 3 is a radial fragmentary cross-sectional view showing a roller type clutch mechanism according to a third embodiment of the present invention.

FIG. 3 is a radial fragmentary cross-sectional view of a roller type clutch mechanism 30 provided with a cage according to a third embodiment of the present invention. The basic construction of this embodiment is the same as that of the first embodiment and therefore, the portions thereof need not be described.

In the present embodiment, the coil portion 16a of a spring member 16 is held by the projection 12 of an annular holding member 11 fitted in annular groove portions provided at the axially opposite ends of the outer race 1. The cage 13 between the rollers 3 differs in shape from the cages in the first and second embodiments.

The outer race 1 is formed with a positioning cut-away 11b, which fixes the holding member 11 to the outer race 1 so that the holding member 11 may not be pivotally moved by the reaction force of the spring member 16.

In the third embodiment, the construction of the spring member and the cage differs from that in the first and second embodiments. The details of the spring member and the cage will first be described with reference to FIG. 4. The spring member 16 comprises two coil portions 16a held at the axially opposite ends of the outer race 1 by the projections 12 of the holding member 11, free ends 16d extending from the coil portions 16a, and bar portions 16b extending from the coil portions 16a to the side opposite to the free ends 16d. The bar portions 16b are connected together by an acting portion 16c for imparting to the rollers 3a biasing force for bringing the rollers into meshing engagement with the cam surface 8 of the outer race 1. The acting portion 16c is substantially parallel to the inner peripheral surface of the inner race 2. The free ends 16d bear against the stepped portions of a groove in the outer race 1. As described above, the spring member 16 is integrally constructed as a whole.

Figure 4:
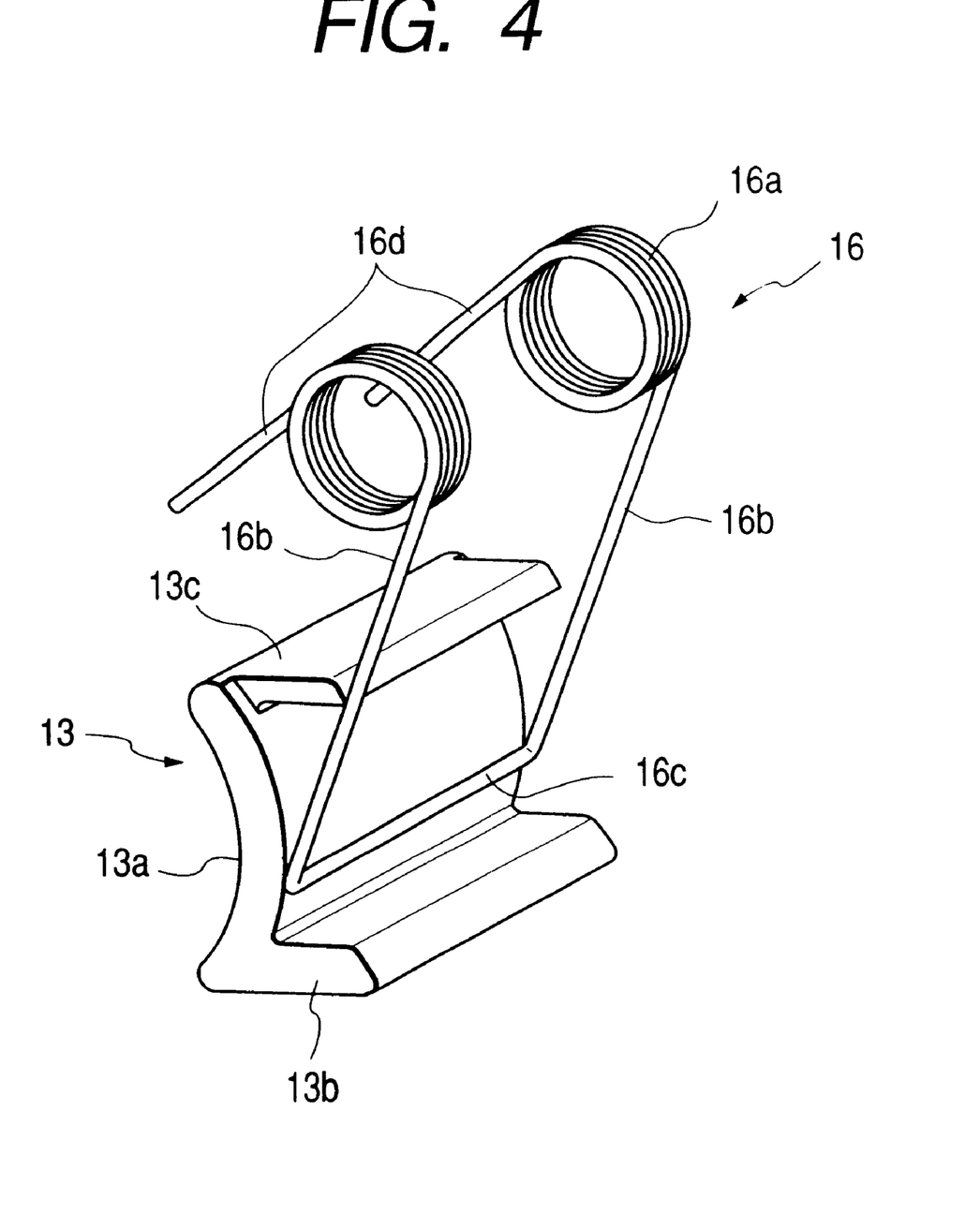
FIG. 4 is a perspective view showing the details of a spring member and a cage in the third embodiment of the present invention.

On the other hand, the cage 13 holding the rollers 3 is integrally provided with a curved surface 13a capable of bearing against and being held by the rollers 3, a substantially flat lower surface 13b extending from a radial end of the curved surface 13a and opposed to the inner peripheral surface of the inner race 2, and a substantially flat upper surface 13c extending from the radial other end of the curved surface 13a and opposed to the inner peripheral surface of the outer race 1.

The acting portion 16c of the spring member 16 causes a biasing force to act on the rollers 3 from the back of the curved surface 13a, and biases the rollers 3 through the curved surface 13a. Accordingly, it is preferable for this curved surface 13a to have substantially the same curvature as the curvature of the peripheral surfaces of the rollers 3.

According to the present embodiment, it is unnecessary to dispose the spring member in a space on the circumference on which the rollers 3 are disposed and therefore, the number of the rollers 3 can be increased and thus, a much greater capacity and downsizing can be achieved as the entire clutch mechanism.

Fourth Embodiment

Figure 5:
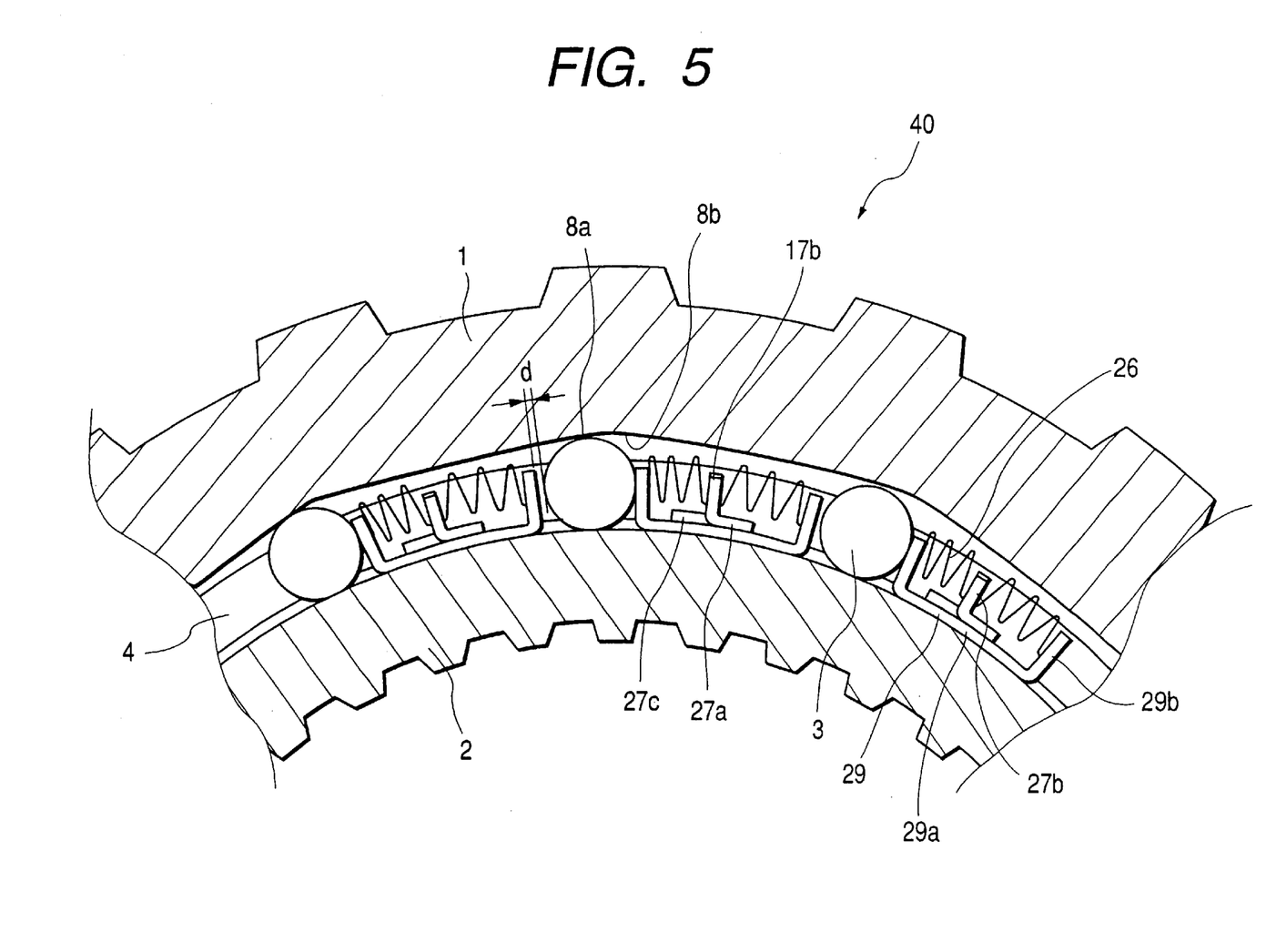
FIG. 5 is a radial fragmentary cross-sectional view showing a roller type clutch mechanism according to a fourth embodiment of the present invention, and shows the manner in which rollers mesh with a circumferentially left cam surface.
Figure 6:
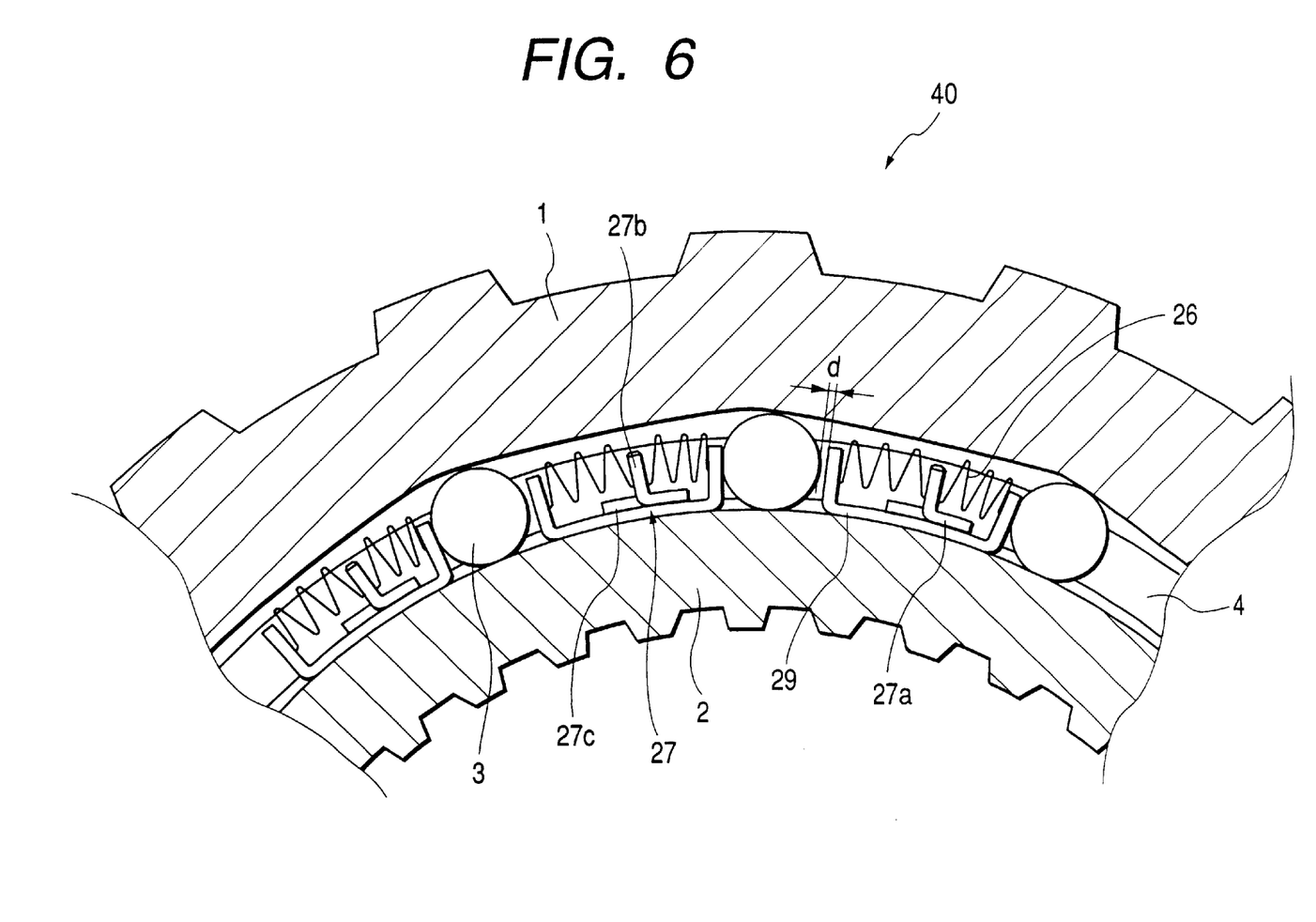
FIG. 6 is a radial fragmentary cross-sectional view showing the roller type clutch mechanism according to the fourth embodiment of the present invention, and shows the manner in which the rollers mesh with a circumferential right cam surface.

FIGS. 5 and 6 are radial fragmentary cross-sectional views of a roller type clutch mechanism 40 provided with a cage according to a fourth embodiment of the present invention. This embodiment is a two-way clutch. The basic construction of this embodiment is the same as that of the first embodiment and therefore, the portions thereof need not be described.

The two-way clutch 40 is provided with a pair of cam surfaces 8a and 8b each having a mountain-shaped axial cross-section on the inner peripheral surface of the outer race 1. Also, a cage 29 is substantially the same as the cage 19 of FIG. 2. A spring member 26 mounted between the rising portions 29b of the cage 29 differs in structure from that in each of the above-described embodiments.

The spring member 26 is accordion-shaped, but unlike that in the aforedescribed embodiment, it is somewhat long in the circumferential direction thereof, and the portion thereof supported by a supporting portion 27 comprising a plate member extending axially from the side plate 4 is located substantially at the center of the spring member 26. The supporting portion 27 comprises a flat bottom surface 27a frictionally contacting with the upper surface of the cage 29 to guide the cage 29, a flat bottom surface 27c continued from the bottom surface 27a, and a rising portion 27b rising from one end of the bottom surface 27a.

It is also possible to provide another projection on the outer side of the side plate 4 and fix it to other member to thereby control more multi-functionally. That is, it is possible to move the side plate 4 circumferentially to thereby change over the biasing direction, and lock up the rollers 3 in two directions (see FIGS. 5 and 6).

FIG. 5 shows a state in which the rollers 3 mesh with the left cam surfaces 8a as viewed in the figure. Each roller 3 meshes leaving a slight clearance d between it and the cage 29. FIG. 6 shows a state in which the rollers 3 mesh with the right cam surfaces 8b as viewed in the figure. As in the case of FIG. 5, each roller 3 meshes leaving a slight clearance d between it and the cage 29. This meshing is effected by moving the side plate 4 circumferentially by an external control device (not shown) to thereby change over the biasing direction.

Figure 10:
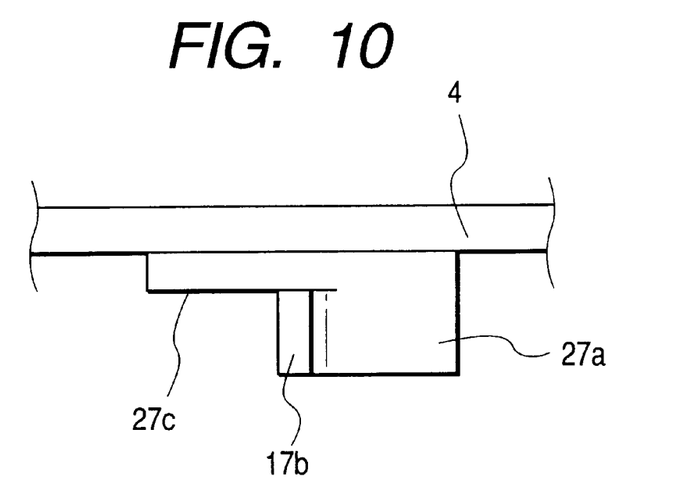
FIG. 10 is a top plan view showing the details of the supporting portion of the roller type clutch mechanism according to the fourth embodiment of the present invention.
Figure 11:
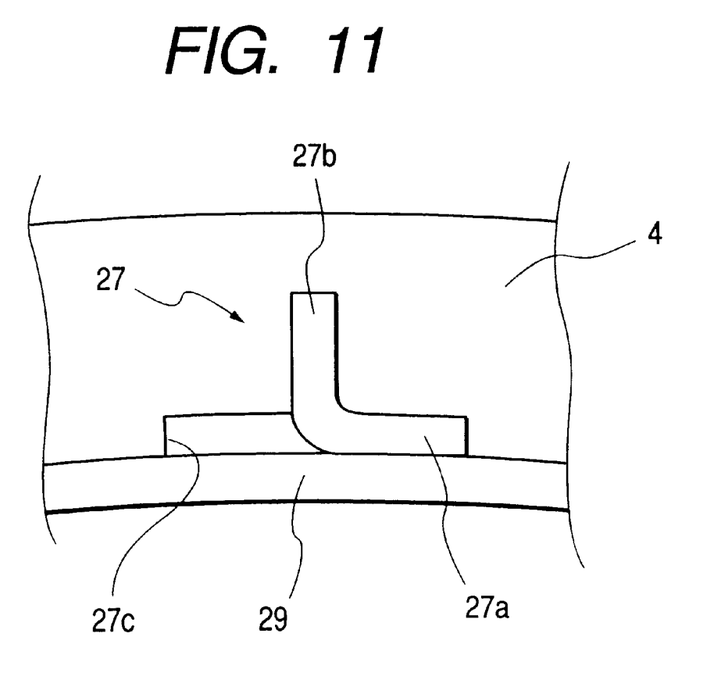
FIG. 11 is a side view of the supporting portion of FIG. 10.

Again in the fourth embodiment, as in the first embodiment, the cage 29 can be reversed and disposed. In that case, it is preferable to make the curvature of the lower surface 29a of the cage 29 coincide with the curvature of the outer peripheral surface of the inner race 2. Also, the supporting portion 27 for the spring member 26 serves to support the spring member 26 and guide the cage 29. As shown in FIGS. 10 and 11, the supporting portion 27 is integrally formed as a plate member extending axially from the side plate 4. The supporting portion 27 comprises two flat bottom surfaces 27a and 27c. A spring supporting portion 27b rises from the bottom surface 27a. The total wide area of the two bottom surfaces 27a and 27c frictionally contacts with the lower surface 29a of the cage 29 and therefore, the spring member 26 can be supported and the cage 29 can be well guided and brought into frictional contact with the outer peripheral surface of the inner race 2.

Figure 7:
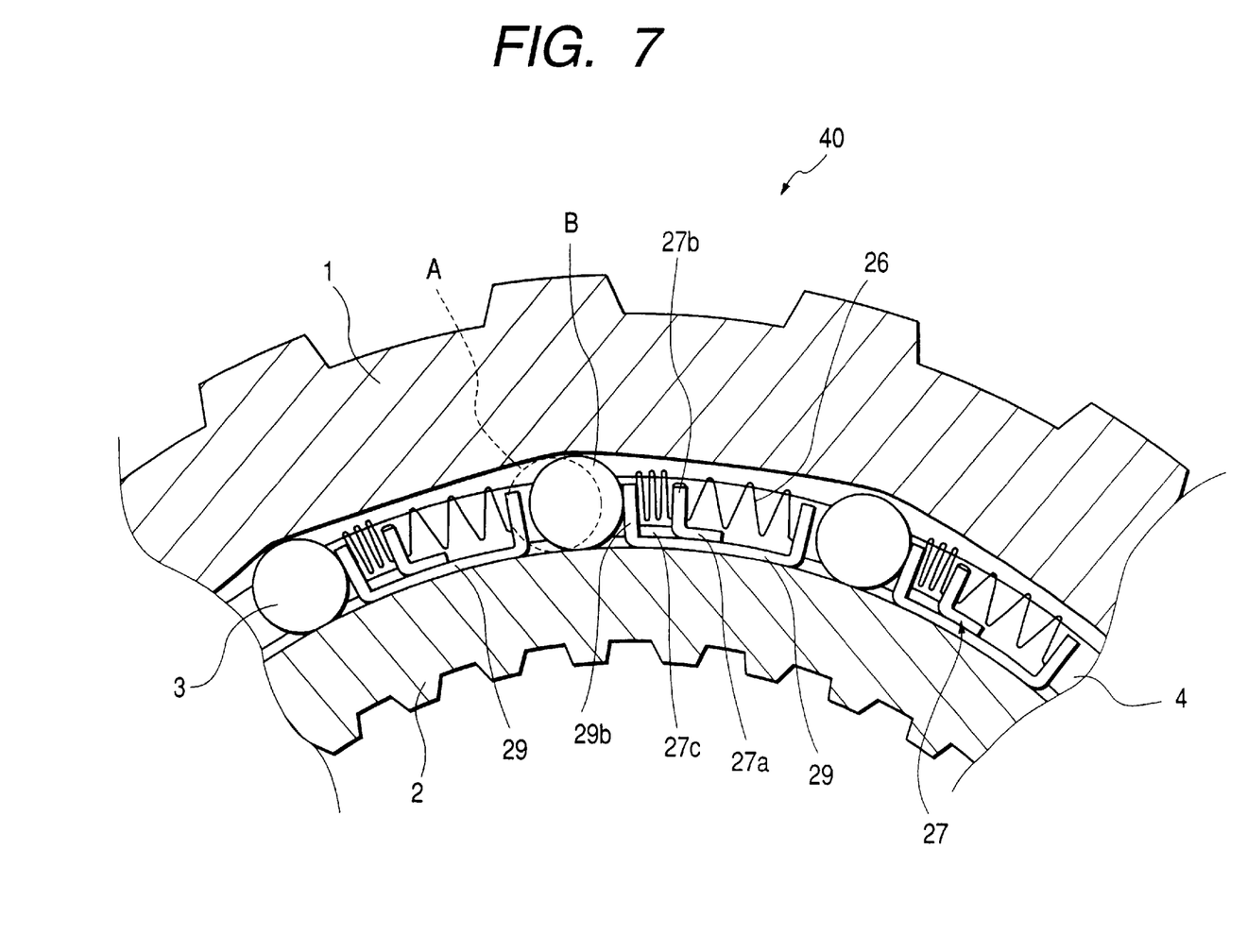
FIG. 7 is a radial fragmentary cross-sectional view showing the roller type clutch mechanism according to the fourth embodiment of the present invention, and illustrates the reverse lock preventing function of the rollers.

FIG. 7 is a cross-sectional view of an axial portion showing the reverse lock preventing function in the roller type clutch mechanism 40 according to the fourth embodiment. Usually, each roller 3 is in a position A indicated by broken line wherein it meshes with the left cam surface of the outer race 1, but even when some force acts on the roller 3 and the roller 3 moves rightwardly as viewed in FIG. 7 and comes to a position B, the roller 3 cannot move rightwardly from the position B as viewed in FIG. 7 because the cage 29 has its rising portion 29b limited in movement by the bottom surface 27a of the supporting portion 27. Accordingly, reverse lock can be prevented.

In each of the above-described embodiments, the cage has the function of a block bearing, and particularly in the embodiments except the third embodiment, it has the protecting function of the spring member which is a torsion spring.

The above-described roller type clutch mechanism of the present invention has the following effects. The rollers can be synchronized and therefore, irrespective of one way or two ways, the advantages of the roller type clutch mechanism can be made to coexist. As the result, the stability of operation under a high load and strong vibration, the resistance to eccentricity and the prevention of popping become possible.

Also, when the present invention is applied to a two-way clutch, there is achieved the effect that the reliability of idle rotation is improved.

What is claimed is:

1. A roller clutch mechanism, comprising:

an outer race;

an inner race radially spaced apart from said outer race and concentrically disposed in said outer race for relative rotation;

a plurality of rollers disposed between said outer race and said inner race to transmit torque between said outer race and said inner race;

a corresponding plurality of spring members arranged to bias said rollers in a meshing direction, each spring member being supported to a respective one of a plurality of support portions formed at substantially equal circumferential intervals on an annular support structure; and a corresponding plurality of cage members arranged to keep said rollers at substantially equal circumferential intervals, each cage member being disposed between two of said rollers so as to be circumferentially displaceable relative to said inner and outer races, and having one circumferential end portion urged against one of said two rollers by the corresponding spring member to bias said one roller in said meshing direction and an opposite circumferential end portion disposed adjacent to the other of said two rollers.

2. A roller clutch mechanism according to claim 1, wherein each cage member has a substantially U-shaped axial cross-section with a base portion disposed adjacent to one of said races and a pair of leg portions extending from said base portion toward the other of said races.

3. A roller clutch mechanism according to claim 2, wherein each cage member has the corresponding spring member and spring member support portion received between said leg portions thereof.

4. A roller clutch mechanism according to claim 3, wherein the spring member is mounted at an intermediate portion thereof to the corresponding spring member support portion and has opposite ends disposed to apply force to said leg portions, respectively.

5. A roller clutch mechanism according to claim 3, wherein the spring member has one end mounted to the corresponding spring member support portion and an opposite end disposed to apply force to one of said leg portions.

6. A roller clutch mechanism according to claim 2, wherein said base portion of the cage member is retained radially between said one race and a guide portion disposed to guide the circumferential displacement of the cage member.

7. A roller clutch mechanism according to claim 6, wherein said guide portion is formed on said annular support structure.

8. A roller clutch mechanism according to claim 7, wherein said annular support structure includes a stop portion to limit the circumferential displacement of the cage member.

9. A roller clutch mechanism according to claim 2, wherein one of said leg portions is urged against said one roller by the corresponding spring, and the other of said leg portions is disposed adjacent said other roller with a slight clearance.

10. A roller clutch mechanism according to claim 1, and which constructed to transmit torque in only one rotational direction.

11. A roller clutch mechanism according to claim 1, and which constructed to transmit torque in two rotational directions.

12. A roller clutch mechanism according to claim 1, wherein said spring members are torsion springs each having a coil spring portion supported by the corresponding support portion of said annular support structure and an acting portion which applies a biasing force to the corresponding cage member.

13. A roller clutch mechanism according to claim 12, wherein said annular support structure includes a plurality of circumferentially spaced projections to which the coil spring portions of said torsion springs are mounted.

14. A roller clutch mechanism according to claim 13, wherein each cage member contacts the two rollers between which it is disposed.

15. A roller clutch mechanism according to claim 12, wherein each cage member has a curved portion substantially conforming with a surface of the roller against which the cage member is urged and a pair of flat portions extending from opposite radial end portions of said curved portion toward the adjacent roller.

16. A roller clutch mechanism, comprising:
   an outer race;
   an inner race radially spaced apart from said outer race and concentrically disposed in said outer race for relative rotation;
   a plurality of rollers disposed between said outer race and said inner race to transmit torque between said outer race and said inner race;
   a plurality of spring members arranged to bias said rollers in one rotational direction; and
   a plurality of cage members disposed between said rollers to keep said rollers at substantially equal intervals, and engaged with said spring members to bias said rollers in a meshing direction;
   wherein said spring members comprise respective coil spring portions supported by the outer race, and respective acting portions which apply biasing force to said rollers through said cage members.

17. A roller clutch mechanism according to claim 16, and which is constructed to transmit torque in two rotational directions.

* * * * *